US012767114B2

(12) United States Patent
Yurue et al.

(10) Patent No.: US 12,767,114 B2
(45) Date of Patent: Oct. 20, 2026

(54) PROCESSOR, SENSOR DEVICE, CONTROL SYSTEM, AND PROCESSING METHOD

(71) Applicant: Robert Bosch GmbH, Stuttgart (DE)

(72) Inventors: Kenji Yurue, Kanagawa (JP); Aaron Troost, Stuttgart (DE); Anne Ditscher, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 18/716,749

(22) PCT Filed: Nov. 30, 2022

(86) PCT No.: PCT/IB2022/061590
§ 371 (c)(1),
(2) Date: Jun. 5, 2024

(87) PCT Pub. No.: WO2023/119026
PCT Pub. Date: Jun. 29, 2023

(65) Prior Publication Data

US 2025/0033626 A1 Jan. 30, 2025

(30) Foreign Application Priority Data

Dec. 23, 2021 (JP) ................................ 2021-208883

(51) Int. Cl.
*B60W 10/188* (2012.01)
*B60W 50/00* (2006.01)
*H04Q 9/00* (2006.01)

(52) U.S. Cl.
CPC ...... *B60W 10/188* (2013.01); *B60W 50/0098* (2013.01); *H04Q 9/00* (2013.01);
(Continued)

(58) Field of Classification Search
CPC .......... B60W 10/188; B60W 50/0098; B60W 2050/0056; B60W 2050/0057; B60W 2300/36; B60W 2520/105; H04Q 9/00
See application file for complete search history.

(56) References Cited

U.S. PATENT DOCUMENTS 9,292,409 B2 * 3/2016 Hammerschmidt ........................ G01R 31/2829
9,346,441 B2 * 5/2016 Rasbornig .............. B60T 8/885
(Continued)

FOREIGN PATENT DOCUMENTS

EP 2031517 A1 3/2009
JP 2000512947 A 10/2000
(Continued)

OTHER PUBLICATIONS

International Search Report and Written Opinion for Application No. PCT/IB2022/061590 dated Mar. 2, 2023 (7 pages).

*Primary Examiner* — Lindsay M Low
*Assistant Examiner* — Susan E Scharpf
(74) *Attorney, Agent, or Firm* — Michael Best & Friedrich LLP

(57) ABSTRACT

The present invention provides a processor, a sensor device, a control system, and a processing method capable of suppressing an increase in the number of mounted sensors. A processor 132 is a processor 132 that processes a sensor signal output from a sensor mounted to a vehicle, and includes: an acquisition section **132*a*** that acquires the sensor
(Continued)

signal output from the sensor; a first processing section 132_b_ that generates first output signals through first filters F11, F12, F13, F14, F15, F16, each of which extracts a first frequency band from the sensor signal acquired by the acquisition section 132_a;_ a second processing section 132_c_ that generates second output signals through second filters F21, F22, F23, F24, F25, F26, each of which extracts a second frequency band, which differs from the first frequency band, from the sensor signal acquired by the acquisition section 132_a;_ and an output section 132_d_ that outputs the first output signal and the second output signal at once.

7 Claims, 3 Drawing Sheets

(52) U.S. Cl.
CPC ............... *B60W 2050/0056* (2013.01); *B60W 2050/0057* (2013.01); *B60W 2300/36* (2013.01); *B60W 2520/105* (2013.01)

(56) References Cited

U.S. PATENT DOCUMENTS 10,782,366 B2 * 9/2020 Stewart ................ G01D 5/2451
2010/0235145 A1 * 9/2010 Ascari .................... B25J 13/083 700/275
2014/0358377 A1 * 12/2014 Hammerschmidt ......................... G01R 31/2829 702/182
2015/0025850 A1 * 1/2015 Reidl ....................... G01D 1/16 702/189
2019/0225174 A1 * 7/2019 Wee .................. B60R 21/01336
2019/0283732 A1 * 9/2019 Otani ....................... G01C 9/06
2019/0285663 A1 * 9/2019 Chino ..................... G01P 15/18
2020/0033825 A1 * 1/2020 Otani ................. G05B 19/0423
2024/0311978 A1 * 9/2024 Owechko .................. G06T 5/70

FOREIGN PATENT DOCUMENTS

JP 2001505151 A 4/2001
JP 2020203655 A 12/2020

* cited by examiner

[FIG. 1]
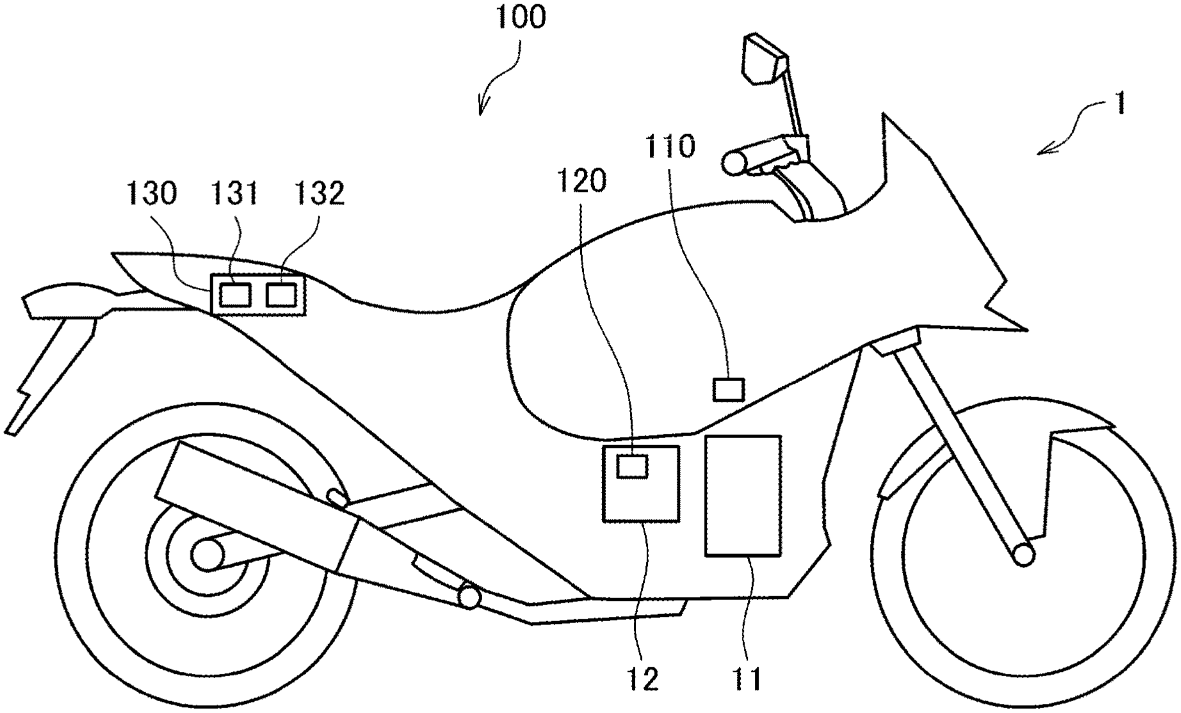
[FIG. 2]
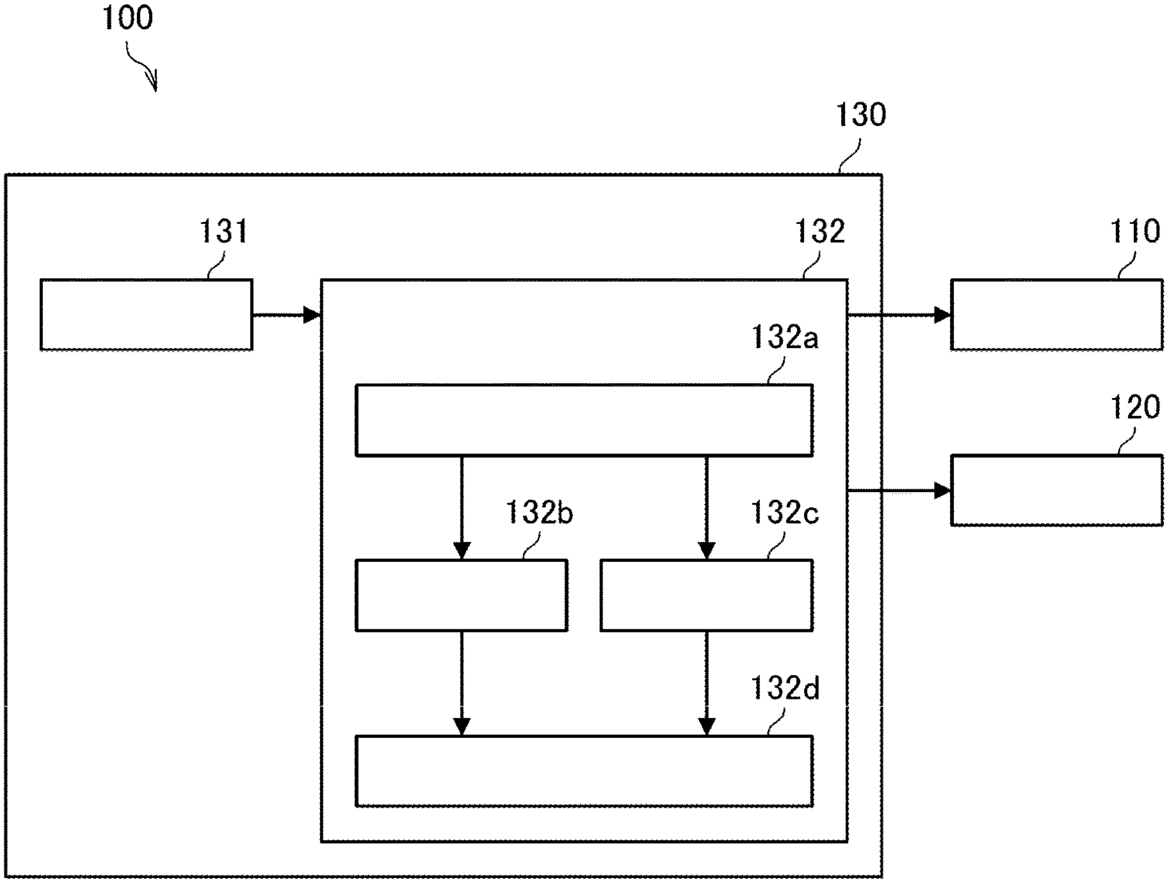

[FIG. 3]
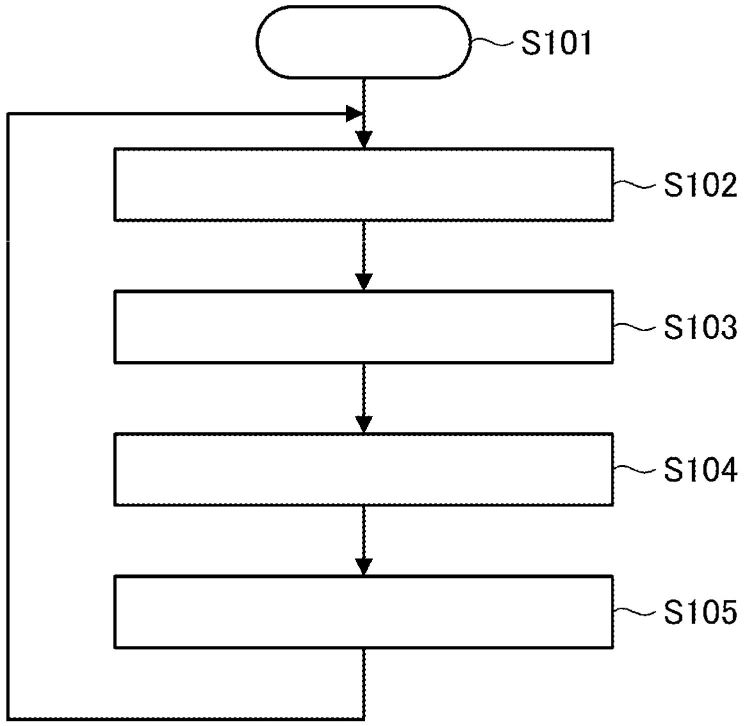

[FIG. 4]
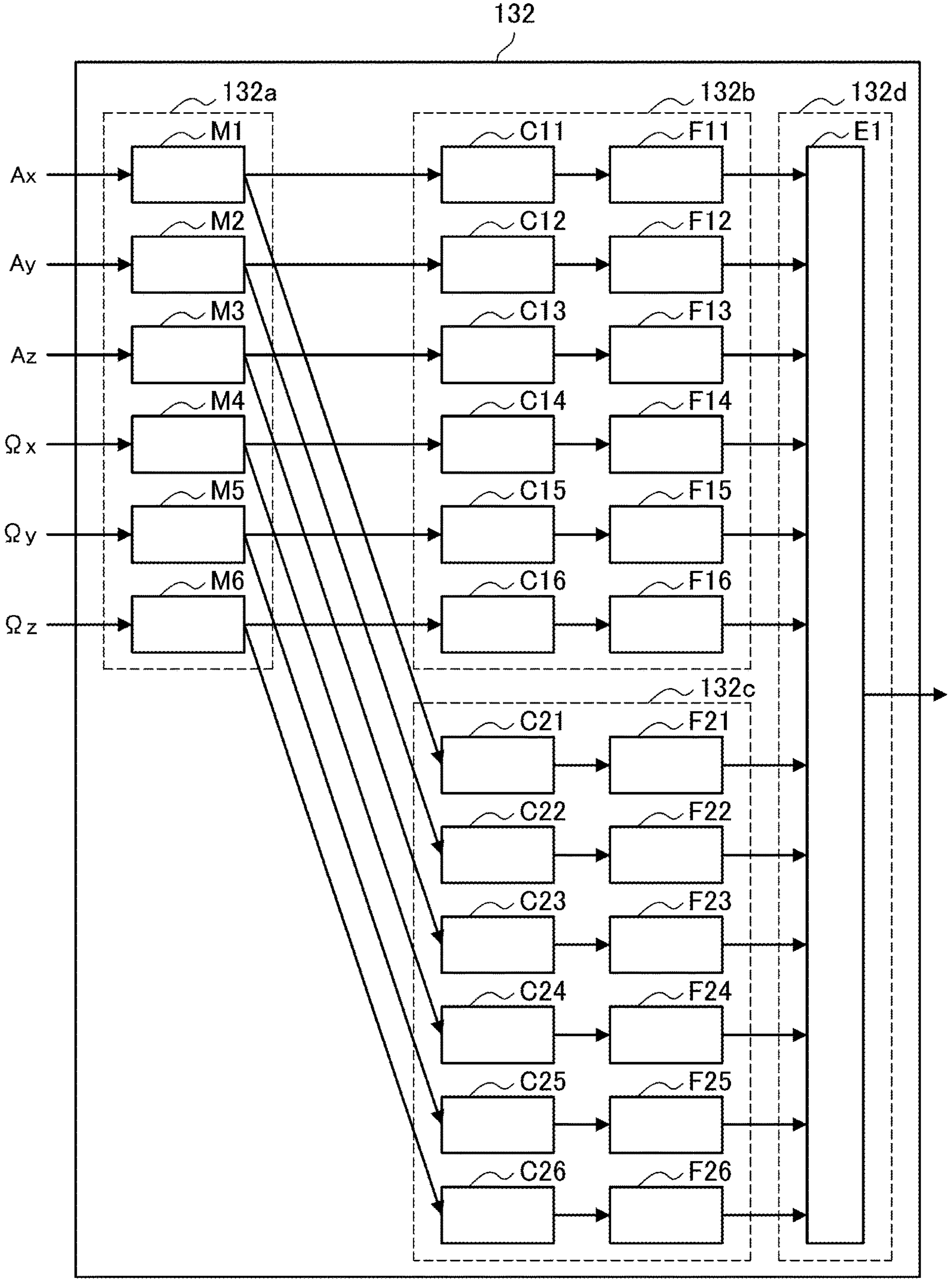

PROCESSOR, SENSOR DEVICE, CONTROL SYSTEM, AND PROCESSING METHOD

BACKGROUND

The present invention relates to a processor, a sensor device, a control system, and a processing method.

Various sensors are mounted to a vehicle, and various types of control are executed by using a sensor signal that is output from each of the sensors. For example, a motorcycle to which an inertial measurement unit is mounted as the sensor is disclosed in JP-A-2020-203655. There is a case where a signal that is output from the inertial measurement unit is used by plural controllers such as a controller for controlling an engine and a controller for controlling a hydraulic pressure control unit.

As described above, there is a case where the sensor signal that is output from the sensor is used by the plural controllers. Here, there is a case where an available frequency band differs by the controllers. Thus, in order for the plural controllers to use the sensor signal, the sensor has to be provided for each of the controllers, which possibly increases the number of the mounted sensors.

SUMMARY

The present invention has been made in view of such a problem and therefore has a purpose of providing a processor, a sensor device, a control system, and a processing method capable of suppressing an increase in the number of mounted sensors.

In order to solve the above problem, a processor is a processor that processes a sensor signal output from a sensor mounted to a vehicle, and includes: an acquisition section that acquires the sensor signal output from the sensor; a first processing section that generates a first output signal through a first filter for extracting a first frequency band from the sensor signal acquired by the acquisition section; a second processing section that generates a second output signal through a second filter for extracting a second frequency band, which differs from the first frequency band, from the sensor signal acquired by the acquisition section; and an output section that outputs the first output signal and the second output signal at once.

In order to solve the above problem, a sensor device is a sensor device that includes: a sensor that is mounted to a vehicle; and a processor that processes a sensor signal output from the sensor. The processor includes: an acquisition section that acquires the sensor signal output from the sensor; a first processing section that generates a first output signal through a first filter for extracting a first frequency band from the sensor signal acquired by the acquisition section; a second processing section that generates a second output signal through a second filter for extracting a second frequency band, which differs from the first frequency band, from the sensor signal acquired by the acquisition section; and an output section that outputs the first output signal and the second output signal at once.

In order to solve the above problem, a control system is a control system that includes: a sensor device including a sensor that is mounted to a vehicle and a processor that processes a sensor signal output from the sensor; and plural controllers. The processor includes: an acquisition section that acquires the sensor signal output from the sensor; a first processing section that generates a first output signal through a first filter for extracting a first frequency band from the sensor signal acquired by the acquisition section; a second processing section that generates a second output signal through a second filter for extracting a second frequency band, which differs from the first frequency band, from the sensor signal acquired by the acquisition section; and an output section that outputs the first output signal and the second output signal at once. The plural controllers include: a first controller that uses a signal limited to the first frequency band; and a second controller that uses a signal limited to the second frequency band. The output section sends the first output signal to the first controller, and sends the second output signal to the second controller.

In order to solve the above problem, a processing method is a processing method for a sensor signal that is output from a sensor mounted to a vehicle, and includes: a first step of acquiring the sensor signal that is output from the sensor; a second step of generating a first output signal through a first filter for extracting a first frequency band from the sensor signal acquired in the first step; a third step of generating a second output signal through a second filter for extracting a second frequency band, which differs from the first frequency band, from the sensor signal acquired in the first step; and a fourth step of outputting the first output signal and the second output signal at once.

According to the present invention, an increase in the number of mounted sensors can be suppressed.

BRIEF DESCRIPTION OF DRAWINGS

FIG. 1 is a schematic view illustrating an outline configuration of a vehicle to which a control system according to an embodiment of the present invention is mounted.

FIG. 2 is a block diagram illustrating an exemplary functional configuration of a processor according to the embodiment of the present invention.

FIG. 3 is a flowchart illustrating an example of a processing procedure that is executed by the processor according to the embodiment of the present invention.

FIG. 4 is a block diagram illustrating a flow of a signal in the processor according to the embodiment of the present invention and a detailed configuration of the processor.

DETAILED DESCRIPTION

A detailed description will hereinafter be made on a preferred embodiment of the present invention with reference to the accompanying drawings. Dimensions, materials, other specific numerical values, and the like described in such an embodiment are merely illustrative to facilitate understanding of the invention, and do not limit the present invention unless otherwise specifically stated. In the present specification and the drawings, elements having substantially the same function and configuration will be denoted by the same reference sign, and a description thereon will not be repeated. In addition, elements that are not directly related to the present invention will not be illustrated.

A description will hereinafter be made on a control system that is mounted to a two-wheeled motorcycle. However, the control system according to the present invention may be used for a vehicle other than the two-wheeled motorcycle (for example, a four-wheeled automobile or the like). In addition, a description will hereinafter be made on a control system for controlling an engine and a hydraulic pressure control unit. However, devices as control targets by the control system according to the present invention are not limited to the following examples. For example, the devices as the control targets by the control system according to the present invention may not include at least one of the engine and the hydraulic pressure control unit, and may include a device (for example, a suspension or the like) other than the engine and the hydraulic pressure control unit. Furthermore, a description will hereinafter be made on a control system that includes an inertial measurement unit as a sensor. However, the sensor in the control system according to the present invention may be a sensor other than the inertial measurement unit (for example, a surrounding environment sensor such as a radar).

Configuration of Control System

A description will be made on a configuration of a control system 100 according to an embodiment of the present invention with reference to FIG. 1 and FIG. 2.

FIG. 1 is a schematic view illustrating an outline configuration of a vehicle 1 to which the control system 100 is mounted. The vehicle 1 is a two-wheeled motorcycle that corresponds to an example of the vehicle according to the present invention. As illustrated in FIG. 1, the vehicle 1 includes an engine 11 and a hydraulic pressure control unit 12.

The engine 11 corresponds to an example of a drive source of the vehicle 1 and can output power for driving a wheel. For example, the engine 11 is provided with: one or plural cylinders, each of which is formed with a combustion chamber therein; a fuel injector that injects fuel into the respective combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided to an intake pipe of the engine 11, and an intake air amount to the combustion chamber varies according to a throttle opening amount as an opening amount of the throttle valve. The drive source of the vehicle 1 may be an electric motor, for example.

The hydraulic pressure control unit 12 is a unit that has a function of controlling a braking force that is generated on the wheel. For example, the hydraulic pressure control unit 12 is provided on an oil passage that connects a master cylinder and a wheel cylinder, and includes components (for example, a control valve and a pump) for controlling a brake hydraulic pressure in the wheel cylinder. By controlling operation of the components in the hydraulic pressure control unit 12, the braking force that is generated on the wheel is controlled. Here, the hydraulic pressure control unit 12 may control the braking force that is generated on each of a front wheel and a rear wheel, or may only control the braking force that is generated on one of the front wheel and the rear wheel.

The control system 100 is mounted to the vehicle 1. The control system 100 is a system for controlling the engine 11 and the hydraulic pressure control unit 12. As illustrated in FIG. 1, the control system 100 includes a first controller 110, a second controller 120, and a sensor device 130.

The first controller 110 controls operation of the engine 11. By controlling output of the engine 11, the first controller 110 can control drive power that is generated to the vehicle 1.

The second controller 120 controls operation of the hydraulic pressure control unit 12. By controlling the braking force that is generated on the wheel by the hydraulic pressure control unit 12, the second controller 120 can control the braking force that is generated to the vehicle 1.

As described above, the control system 100 includes the plural controllers. In an example illustrated in FIG. 1, the plural controllers in the control system 100 include the first controller 110 and the second controller 120. However, in the case where devices as control targets by the control system 100 differ from those in FIG. 1, the plural controllers in the control system 100 also differ from those in the example illustrated in FIG. 1.

The sensor device 130 includes an inertial measurement unit (IMU) 131 and a processor 132. The inertial measurement unit 131 corresponds to an example of the sensor according to the present invention. The inertial measurement unit 131 includes a three-axis acceleration sensor and a three-axis gyroscope sensor, and detects acceleration in three axial directions and angular velocities around three axes. The inertial measurement unit 131 is provided to a trunk of the vehicle 1, for example. The processor 132 processes a sensor signal that is output from the inertial measurement unit 131. Then, the processor 132 sends a signal, which is acquired by processing the sensor signal, to the first controller 110 and the second controller 120. The first controller 110 and the second controller 120 use the signal that is received from the processor 132 for control of the engine 11 and control of the hydraulic pressure control unit 12, respectively.

The processor 132 includes: a central processing unit (CPU) as an arithmetic processing unit; read only memory (ROM) as a storage element for storing a program, an arithmetic parameter, and the like that are used by the CPU; random access memory (RAM) as a storage element for temporarily storing a parameter and the like that are appropriately changed by running of the CPU; and the like.

FIG. 2 is a block diagram illustrating an exemplary functional configuration of the processor 132. As illustrated in FIG. 2, for example, the processor 132 includes an acquisition section 132*a*, a first processing section 132*b*, a second processing section 132*c*, and an output section 132*d*. In addition, the processor 132 communicates with each of the devices in the vehicle 1.

The acquisition section 132*a* acquires the sensor signal that is output from the inertial measurement unit 131. The sensor signal that is acquired by the acquisition section 132*a* is processed by each of the first processing section 132*b* and the second processing section 132*c*. In this way, a first output signal is generated by the first processing section 132*b*, and a second output signal is generated by the second processing section 132*c*. The generated output signals are output by the output section 132*d*. More specifically, the output section 132*d* sends the first output signal (a digital signal) to the first controller 110 and sends the second output signal (a digital signal) to the second controller 120. In the control system 100, an increase in the number of the mounted sensors can be suppressed by devising the processing that is executed by the processor 132. A detailed description on the processing that is executed by the processor 132 will be made below.

Operation of Processor

A description will be made on operation of the processor 132 according to the embodiment of the present invention with reference to FIG. 3 and FIG. 4.

FIG. 3 is a flowchart illustrating an example of a processing procedure that is executed by the processor 132. Step S101 in FIG. 3 corresponds to initiation of the control flow illustrated in FIG. 3. FIG. 4 is a block diagram illustrating a flow of the signal in the processor 132 and a detailed configuration of the processor 132. A description will hereinafter be made on the flowchart illustrated in FIG. 3 with appropriate reference to FIG. 4.

When the control flow illustrated in FIG. 3 is initiated, in step S102, the acquisition section 132*a* acquires the sensor signal that is output from the inertial measurement unit 131.

In the example illustrated in FIG. 4, the acquisition section 132*a* of the processor 132 includes storage sections M1, M2, M3, M4, M5, M6. For example, each of the storage sections M1, M2, M3, M4, M5, M6 is realized by a storage area of the RAM in the processor 132.

Here, the sensor signals that are output from the inertial measurement unit 131 include signals Ax, Ay, Az indicating the acceleration in the three axial directions of the vehicle 1 and signals Ωx, Ωy, Ωz indicating the angular velocities around the three axes of the vehicle 1. In the inertial measurement unit 131, a three-axis coordinate system is set. The three-axis coordinate system has an x-axis, a y-axis, and a z-axis that are orthogonal to each other, and is fixed to a vehicle body of the vehicle 1. The three-axis coordinate system that is set in the inertial measurement unit 131 may be an appropriate coordinate system that differs from the coordinate system fixed to the vehicle body. In this case, after being detected, the sensor signal is converted into the coordinate system that is fixed to the vehicle body. The signals Ax, Ay, Az indicate acceleration in an x-axis direction, a y-axis direction, and a z-axis direction, respectively. The signals Ωx, Ωy, Ωz indicate angular velocities around the x-axis, the y-axis, and the z-axis, respectively. The signals Ax, Ay, Az, Ωx, Ωy, Ωz that are output from the inertial measurement unit 131 are stored as digital values in the storage sections M1, M2, M3, M4, M5, M6, respectively.

After step S102 in FIG. 3, in step S103, the first processing section 132*b* generates the first output signal from the sensor signal that is acquired by the acquisition section 132*a*. After step S103, in step S104, the second processing section 132*c* generates the second output signal from the sensor signal that is acquired by the acquisition section 132*a*. Here, step S104 may be executed prior to step S103 or may be executed in parallel with step S103.

By the way, there is a case where an available frequency band differs among the plural controllers in the control system 100. More specifically, the available frequency band differs between the first controller 110 and the second controller 120. The first controller 110 uses the signal that is limited to a first frequency band. Meanwhile, the second controller 120 uses the signal that is limited to a second frequency band, which differs from the first frequency band. For example, each of the first frequency band and the second frequency band is a frequency band having a width from 0 Hz to an upper limit frequency, and the upper limit frequency differs between the first frequency band and the second frequency band. The upper limit frequency differs according to a type of the controller, and can be any of various values from 10 Hz to 70 Hz, for example. A lower limit frequency of each of the first frequency band and the second frequency band may not be 0 Hz.

Here, the first processing section 132*b* generates the first output signal through a first filter as a digital filter for extracting the first frequency band from the sensor signal that is acquired by the acquisition section 132*a*. As a result, the first output signal that is limited to the first frequency band is sent to the first controller 110 as described above. Thus, the first controller 110 can appropriately use the signal received from the processor 132 for the control of the engine 11.

Meanwhile, the second processing section 132*c* generates the second output signal through a second filter as a digital filter for extracting the second frequency band from the sensor signal that is acquired by the acquisition section 132*a*. As a result, the second output signal that is limited to the second frequency band is sent to the second controller 120 as described above. Thus, the second controller 120 can appropriately use the signal received from the processor 132 for the control of the hydraulic pressure control unit 12.

In the example illustrated in FIG. 4, the first processing section 132*b* of the processor 132 has relay sections C11, C12, C13, C14, C15, C16 and first filters F11, F12, F13, F14, F15, F16. For example, the relay sections C11, C12, C13, C14, C15, C16 and the first filters F11, F12, F13, F14, F15, F16 are operated when the program that is stored in the ROM of the processor 132 is executed.

The relay sections C11, C12, C13, C14, C15, C16 read information that is stored in the storage sections M1, M2, M3, M4, M5, M6, and transmit the information to the first filters F11, F12, F13, F14, F15, F16, respectively. Each of the first filters F11, F12, F13, F14, F15, F16 is a filter that extracts the first frequency band. Each of the first filters F11, F12, F13, F14, F15, F16 is a low-pass filter, for example. However, in the case where the lower limit frequency of the first frequency band is not 0 Hz, each of the first filters F11, F12, F13, F14, F15, F16 is a bandpass filter.

The signal Ax that is stored as the digital value in the storage section MI is read by the relay section C11, and the first output signal that corresponds to the signal Ax is generated by the first filter F11. The signal Ay that is stored as the digital value in the storage section M2 is read by the relay section C12, and the first output signal that corresponds to the signal Ay is generated by the first filter F12. The signal Az that is stored as the digital value in the storage section M3 is read by the relay section C13, and the first output signal that corresponds to the signal Az is generated by the first filter F13.

The signal Ωx that is stored as the digital value in the storage section M4 is read by the relay section C14, and the first output signal that corresponds to the signal Ωx is generated by the first filter F14. The signal Ωy that is stored as the digital value in the storage section M5 is read by the relay section C15, and the first output signal that corresponds to the signal Ωy is generated by the first filter F15. The signal Ωz that is stored as the digital value in the storage section M6 is read by the relay section C16, and the first output signal that corresponds to the signal Ωz is generated by the first filter F16.

In addition, in the example illustrated in FIG. 4, the second processing section 132*c* of the processor 132 has relay sections C21, C22, C23, C24, C25, C26 and second filters F21, F22, F23, F24, F25, F26. For example, the relay sections C21, C22, C23, C24, C25, C26 and the second filters F21, F22, F23, F24, F25, F26 are operated when the program that is stored in the ROM of the processor 132 is executed.

The relay sections C21, C22, C23, C24, C25, C26 reads the information that is stored in the storage sections M1, M2, M3, M4, M5, M6, and transmits the information to the second filters F21, F22, F23, F24, F25, F26, respectively. Each of the second filters F21, F22, F23, F24, F25, F26 is a filter that extracts the second frequency band. Each of the second filters F21, F22, F23, F24, F25, F26 is the low-pass filter, for example. However, in the case where the lower limit frequency of the second frequency band is not 0 Hz, each of the second filters F21, F22, F23, F24, F25, F26 is the bandpass filter.

The signal Ax that is stored as the digital value in the storage section M1 is read by the relay section C21, and the second output signal that corresponds to the signal Ax is generated by the second filter F21. The signal Ay that is stored as the digital value in the storage section M2 is read by the relay section C22, and the second output signal that corresponds to the signal Ay is generated by the second filter F22. The signal Az that is stored as the digital value in the storage section M3 is read by the relay section C23, and the second output signal that corresponds to the signal Az is generated by the second filter F23.

The signal Ωx that is stored as the digital value in the storage section M4 is read by the relay section C24, and the second output signal that corresponds to the signal Ωx is generated by the second filter F24. The signal Ωy that is stored as the digital value in the storage section M5 is read by the relay section C25, and the second output signal that corresponds to the signal Ωy is generated by the second filter F25. The signal Ωz that is stored as the digital value in the storage section M6 is read by the relay section C26, and the second output signal that corresponds to the signal Ωz is generated by the second filter F26.

As described above, in the processor 132, processing that uses the different filters (for example, the first filter F11 and the second filter F21) is independently executed for the sensor signal (for example, the signal Ax) that is output from the inertial measurement unit 131 and stored in the common storage section (for example, the storage section M1). In this way, the first output signal and the second output signal as different output signals are generated at the same timing.

The above description has been made on the example in which the relay sections C11, C12, C13, C14, C15, C16 and the relay sections C21, C22, C23, C24, C25, C26 read and transmit the information. However, each of these relay sections may read the information that is stored in the corresponding storage section, and may duplicate and store the information in the storage area of the RAM. In this case, the first output signal and the second output signal can be generated by executing processing that uses the respective filters on the information duplicated by the respective relay sections and stored. Also, in this case, the processing that uses the different filters (for example, the first filter F11 and the second filter F21) is independently executed for the sensor signal (for example, the signal Ax) that is output from the inertial measurement unit 131. In this way, the first output signal and the second output signal as the different output signals are generated at the same timing.

After step S104 in FIG. 3, in step S105, the output section 132*d* outputs the first output signal and the second output signal as the digital signals at a time interval requested from the controller side (that is, outputs the first output signal and the second output signal at once), and the processing returns to step S102. More specifically, the output section 132*d* sends the first output signal to the first controller 110 and sends the second output signal to the second controller 120. Here, outputting of the first output signal and the second output signal at once only needs to be outputting of the first output signal and outputting of the second output signal in a specified period such that the processing in the first controller 110 and the processing in the second controller 120 can be executed in parallel. For example, outputting of the first output signal and the second output signal at once may be outputting of the first output signal and the second output signal at the same time from different output ports or may be that outputting of the first output signal and outputting of the second output signal from the same output port are alternated in a time-division manner.

In the example illustrated in FIG. 4, the output section 132*d* of the processor 132 includes a selection section E1. For example, the selection section E1 is operated when the program that is stored in the ROM of the processor 132 is executed.

As described above, the sensor signals that are output from the inertial measurement unit 131 include plural types of the signals. The first processing section 132*b* and the second processing section 132*c* generate plural types of the first output signals and plural types of the second output signals, respectively.

The selection section E1 selects the type of the signal that is requested by the first controller 110 from the plural types of the first output signals that are generated by the first processing section 132*b,* and sends such a signal to the first controller 110. In the example illustrated in FIG. 4, the selection section E1 selects the type of the signal that is requested by the first controller 110 from the first output signals that correspond to the signals Ax, Ay, Az, Ωx, Ωy, Ωz generated by the first filters F11, F12, F13, F14, F15, F16, respectively.

For example, in the case where the first controller 110 only requests the acceleration signals, the selection section E1 selects the first output signals that correspond to the signals Ax, Ay, Az generated by the first filters F11, F12, F13, respectively, and sends such first output signals to the first controller 110. In addition, for example, in the case where the first controller 110 only requests the angular velocity signals, the selection section E1 selects the first output signals that correspond to the signals Ωx, Ωy, Ωz generated by the first filters F14, F15, F16, respectively, and sends such first output signals to the first controller 110. In the case where the first controller 110 requests both of the acceleration signals and the angular velocity signals, the selection section E1 selects all of the first output signals that correspond to the signals Ax, Ay, Az, Ωx, Ωy, Ωz generated by the first filters F11, F12, F13, F14, F15, F16, respectively, and outputs all of the first output signals to the first controller 110.

The selection section E1 selects the type of the signal that is requested by the second controller 120 from the plural types of the second output signals that are generated by the second processing section 132*c,* and sends such a signal to the second controller 120. In the example illustrated in FIG. 4, the selection section E1 selects the type of the signal that is requested by the second controller 120 from the second output signals that correspond to the signals Ax, Ay, Az, Ωx, Ωy, Ωz generated by the second filters F21, F22, F23, F24, F25, F26, respectively.

For example, in the case where the second controller 120 only requests the acceleration signals, the selection section E1 selects the second output signals that correspond to the signals Ax, Ay, Az generated by the second filters F21, F22, F23, respectively, and sends such second output signals to the second controller 120. In addition, for example, in the case where the second controller 120 only requests the angular velocity signals, the selection section E1 selects the second output signals that correspond to the signals Ωx, 22*y,* Ωz generated by the second filters F24, F25, F26, respectively, and sends such second output signals to the second controller 120. In the case where the second controller 120 requests both of the acceleration signals and the angular velocity signals, the selection section E1 selects all of the second output signals that correspond to the signals Ax, Ay, Az, Ωx, Ωy, Ωz generated by the second filters F21, F22, F23, F24, F25, F26, respectively, and outputs all of the second output signals to the second controller 120.

As described above, in the processor 132, the first processing section 132*b* generates the first output signal through the first filter extracting the first frequency band from the sensor signal that is acquired by the acquisition section 132*a*. Meanwhile, the second processing section 132*c* generates the second output signal through the second filter for extracting the second frequency band from the sensor signal that is acquired by the acquisition section 132*a*. Just as described, the processing that uses the different filters is independently executed for the common sensor signal that is output from the inertial measurement unit 131. In this way, the first output signal and the second output signal as the different output signals are generated at the same timing. As a result, the output section 132*d* can output the first output signal and the second output signal at the time interval requested from the controller side (that is, output the first output signal and the second output signal at once).

Here, it is considered that, unlike this embodiment, in the case where only one of the first processing section 132*b* and the second processing section 132*c* is provided as the processing section, a state where the first output signal can be sent to the first controller 110 and a state where the second output signal can be sent to the second controller 120 are switched by rewriting each of the filters to change the extracted frequency band. However, in this case, a time difference is generated between sending of the first output signal to the first controller 110 and sending of the second output signal to the second controller 120. Thus, the processing in the first controller 110 and the processing in the second controller 120 cannot be executed in parallel.

On the other hand, in this embodiment, as described above, since both the first processing section 132*b* and the second processing section 132*c* are provided as the processing sections, the output section 132*d* can output the first output signal and the second output signal at once. Thus, even in the case where the available frequency band differs between the plural controllers (for example, between the first controller 110 and the second controller 120) in the control system 100, the single sensor device 130 can send the available output signal to each of the plural controllers. Therefore, since there is no need to provide the sensor (the inertial measurement unit 131 in the above example) for each of the controllers, the increase in the number of the mounted sensors can be suppressed.

The above description has been made on the example in which the number of the controllers whose available frequency bands differ from each other are two in the control system 100. However, the number of the controllers whose available frequency bands differ from each other may be three or more in the control system 100. In such a case, in addition to the first processing section 132*b* and the second processing section 132*c*, the processor 132 further includes one or plural processing sections, each of which generates the output signal through the filter for extracting a different frequency band from both of the first frequency band and the second frequency band from the sensor signal that is acquired by the acquisition section 132*a*. That is, the processor 132 only needs to include the plural processing sections, each of which generates the output signal by using the filter for extracting the different frequency band from each other from the common sensor signal.

Effects of Processor

A description will be made on effects of the processor 132 according to the embodiment of the present invention.

In the processor 132, the acquisition section 132*a* acquires the sensor signal that is output from the sensor (the inertial measurement unit 131 in the above example). The first processing section 132*b* generates the first output signal through the first filter (each of F11, F12, F13, F14, F15, F16 in the above example) for extracting the first frequency band from the sensor signal that is acquired by the acquisition section 132*a*. The second processing section 132*c* generates the second output signal through the second filter (each of F21, F22, F23, F24, F25, F26 in the above example) for extracting the second frequency band differing from the first frequency band from the sensor signal that is acquired by the acquisition section 132*a*. The output section 132*d* outputs the first output signal and the second output signal at once. In this way, the single sensor device 130 can send the available output signals to the plural controllers. Therefore, since there is no need to provide the sensor for each of the controllers, the increase in the number of the mounted sensors can be suppressed.

Preferably, in the processor 132, the output section 132*d* sends the first output signal to the first controller 110 that uses the signal limited to the first frequency band, and sends the second output signal to the second controller 120 that uses the signal limited to the second frequency band. In this way, the available output signal can be sent to each of the first controller 110 and the second controller 120. Therefore, the first controller 110 and the second controller 120 can each appropriately use the signal received from the processor 132.

Preferably, in the processor 132, the sensor signals include the plural types of the signals, the first processing section 132*b* generates the plural types of the first output signals, the second processing section 132*c* generates the plural types of the second output signals, and the output section 132*d* selects the type of the signal requested by the first controller 110 from the plural types of the first output signals generated by the first processing section 132*b*, sends such a signal to the first controller 110, selects the type of the signal requested by the second controller 120 from the plural types of the second output signals generated by the second processing section 132*c*, and sends such a signal to the second controller 120. In this way, only the types of the output signals requested by the first controller 110 and the second controller 120 can be sent to the respective controllers. Therefore, sending of an unnecessary signal can be suppressed, and thus a processing burden can be reduced.

Preferably, in the processor 132, the sensor is the inertial measurement unit 131 that detects the acceleration in the three axial directions and the angular velocities around the three axes, and the sensor signals include the signal indicating the acceleration in the three axial directions and the signal indicating the angular velocities around the three axes. Therefore, since there is no need to provide the inertial measurement unit 131 for each of the controllers, the increase in the number of the mounted inertial measurement units 131 can be suppressed.

The description has been made so far on the preferred embodiment of the present invention with reference to the accompanying drawings. However, it is needless to say that the present invention is not limited to the above-described embodiment and that various modification examples and correction examples falling within the scope described in the claims also belong to the technical scope of the present invention.

For example, the processing that has been described in the present specification by using the flowchart may not necessarily be executed in the order illustrated in the flowchart. Some of the processing steps may be executed in parallel. In addition, an additional processing step may be adopted, and some of the processing steps may not be provided.

For example, a series of the control processing by the processor 132 described above may be realized by using any of software, hardware, and a combination of the software and the hardware. The program constituting the software is stored in advance in a storage medium that is provided inside or outside an information processor, for example.

Reference Signs List

1: Vehicle
11: Engine
12: Hydraulic pressure control unit
100: Control system
110: First controller
120: Second controller
130: Sensor device
131: Inertial measurement unit (sensor)
132: Processor
132*a:* Acquisition section
132*b:* First processing section
132*c:* Second processing section
132*d:* Output section
C11: Relay section
C12: Relay section
C13: Relay section
C14: Relay section
C15: Relay section
C16: Relay section
C21: Relay section
C22: Relay section
C23: Relay section
C24: Relay section
C25: Relay section
C26: Relay section
E1: Selection section
F11: First filter
F12: First filter
F13: First filter
F14: First filter
F15: First filter
F16: First filter
F21: Second filter
F22: Second filter
F23: Second filter
F24: Second filter
F25: Second filter
F26: Second filter
M1: Storage section
M2: Storage section
M3: Storage section
M4: Storage section
M5: Storage section
M6: Storage section

The invention claimed is:

1. An electronic processor (132) that processes a sensor signal output from a sensor (131) mounted to a vehicle (1), the electronic processor configured to:
acquire the sensor signal output from the sensor (131);
generate a first output signal through a first filter (F11, F12, F13, F14, F15, F16) for extracting a first frequency band from the sensor signal;
generate a second output signal through a second filter (F21, F22, F23, F24, F25, F26) for extracting a second frequency band, which differs from the first frequency band, from the sensor signal; and
output the first output signal and the second output signal at once to a first controller (110) and a second controller (120) respectively,
wherein the first controller (110) is configured to control a first vehicle system based on the first output signal and the second controller (120) is configured to control a second vehicle system based on the second output signal.

2. The electronic processor according to claim 1, wherein the first controller (110) uses a signal limited to the first frequency band, and
the second controller (120) uses a signal limited to the second frequency band.

3. The electronic processor according to claim 2, wherein the sensor signals include plural types of signals,
the electronic processor generates plural types of the first output signals,
the electronic processor generates plural types of the second output signals, and the electronic processors selects a type of a signal requested by the first controller (110) from the plural types of the first output signals and sends such a signal to the first controller (110) and selects a type of a signal requested by the second controller (120) from the plural types of the second output signals and sends such a signal to the second controller (120).

4. The processor according to claim 1, wherein
the sensor is an inertial measurement unit (131) that detects acceleration in three axial directions and angular velocities around three axes, and
the sensor signals include a signal indicating the acceleration in the three axial directions and a signal indicating the angular velocities around the three axes.

5. A sensor device (130) comprising:
a sensor (131) that is mounted to a vehicle (1); and
an electronic processor (132) that processes a sensor signal output from the sensor (131), wherein
the electronic processor (132) is configured to:
acquire the sensor signal output from the sensor (131);
generate a first output signal through a first filter (F11, F12, F13, F14, F15, F16) for extracting a first frequency band from the sensor signal;
generate a second output signal through a second filter (F21, F22, F23, F24, F25, F26) for extracting a second frequency band, which differs from the first frequency band, from the sensor signal; and
output the first output signal and the second output signal at once to a first controller (110) and a second controller (120) respectively,
wherein the first controller (110) is configured to control a first vehicle system based on the first output signal and the second controller (120) is configured to control a second vehicle system based on the second output signal.

6. A control system (100) comprising:
a sensor device (130) including a sensor (131) that is mounted to a vehicle and an electronic processor (132) that processes a sensor signal output from the sensor (131); and
plural controllers (110, 120), wherein
the electronic processor (132) is configured to:
acquire the sensor signal output from the sensor (131);
generate a first output signal through a first filter (F11, F12, F13, F14, F15, F16) for extracting a first frequency band from the sensor signal;
generate a second output signal through a second filter (F21, F22, F23, F24, F25, F26) for extracting a second frequency band, which differs from the first frequency band, from the sensor signal; and output the first output signal and the second output signal at once, the plural controllers (110, 120) include:

a first controller (110) that uses a signal limited to the first frequency band; and a second controller (120) that uses a signal limited to the second frequency band, and the electronic processor sends the first output signal to the first controller (110) and sends the second output signal to the second controller (120), wherein the first controller (110) controls a first vehicle system based on the first output signal and the second controller (120) controls a second vehicle system based on the second output signal.

7. A processing method for a sensor signal that is output from a sensor (131) mounted to a vehicle (1), the processing method comprising:

acquiring the sensor signal that is output from the sensor (131);

generating a first output signal through a first filter (F11, F12, F13, F14, F15, F16) for extracting a first frequency band from the sensor signal;

generating a second output signal through a second filter (F21, F22, F23, F24, F25, F26) for extracting a second frequency band, which differs from the first frequency band, from the sensor signal;

outputting the first output signal and the second output signal at once to a first controller (110) and a second controller (120) respectively, controlling, via the first controller (110), a first vehicle system based on the first output signal, and controlling, via the second controller (120), a second vehicle system based on the second output signal.

* * * * *